(12) United States Patent
Igasaki et al.

(10) Patent No.: US 6,560,001 B1
(45) Date of Patent: May 6, 2003

(54) SPATIAL OPTICAL MODULATING DEVICE

(75) Inventors: Yasunori Igasaki, Hamamatsu (JP);
Narihiro Yoshida, Hamamatsu (JP);
Haruyoshi Toyoda, Hamamatsu (JP);
Tsutomu Hara, Hamamatsu (JP)

(73) Assignee: Hamamatsu Photonics K.K., Hamatsu (JP)

( * ) Notice: Subject to any disclaimer, the term of this patent is extended or adjusted under 35 U.S.C. 154(b) by 0 days.

(21) Appl. No.: 10/088,199

(22) PCT Filed: Sep. 27, 2000

(86) PCT No.: PCT/JP00/06659
§ 371 (c)(1),
(2), (4) Date: Mar. 15, 2002

(87) PCT Pub. No.: WO01/23946
PCT Pub. Date: Apr. 5, 2001

(30) Foreign Application Priority Data

Sep. 28, 1999 (JP) .............................. 11/274712

(51) Int. Cl.[7] .......................... G02F 1/03; G02F 1/135; H04N 9/12; G03B 21/00
(52) U.S. Cl. ...................... 359/245; 359/290; 359/291; 359/618; 359/619; 349/25; 349/5; 349/7; 349/20; 348/757; 348/383; 348/751; 353/31; 353/34; 353/30; 353/37
(58) Field of Search ........................ 359/259, 251–253, 359/238, 239, 244, 245, 290, 291, 618, 619; 349/17, 25, 5, 7, 20; 348/757, 383, 751; 353/30, 31, 34, 37

(56) References Cited

U.S. PATENT DOCUMENTS 5,587,829 A * 12/1996 Alexander et al. .......... 359/287
6,348,990 B1   2/2002 Igasaki et al. .............. 359/259

FOREIGN PATENT DOCUMENTS

| GB | 2 330 471 A | * | 4/1999 |
|----|-------------|---|--------|
| JP | A 57-118471 |   | 7/1982 |
| JP | A 4-181226  |   | 6/1992 |
| JP | A 4-289837  |   | 10/1992 |
| JP | A 4-301818  |   | 10/1992 |
| JP | A 6-337433  |   | 12/1994 |
| JP | A 7-72503   |   | 3/1995 |
| JP | A 7-114041  |   | 5/1995 |
| JP | A 9-113928  |   | 5/1997 |

* cited by examiner

Primary Examiner—Loha Ben
Assistant Examiner—M. Hasan
(74) Attorney, Agent, or Firm—Oliff & Berridge, PLC

(57) ABSTRACT

A spatial light modulating device includes: an electrically-addressed type element for being addressed by electric signals representing information to be written, the electrically-addressed type element including an image display portion having a pixel structure, the electrically-addressed type element being inputted with write light; an optically-addressed type spatial light modulator including a thin film material portion and a pair of substrates, the thin film material portion being provided between the pair of substrates, the thin film material portion having an optical addressing layer and a light modulation layer which are provided one on the other, the optically-addressed type spatial light modulator being inputted with read light; and a compensation layer having a predetermined thickness and provided between the image display portion and the thin film material portion.

7 Claims, 11 Drawing Sheets

IRRADIATION BY SUBSTANTIALLY PARALLEL LIGHT BEAM (WRITE LIGHT)

READ LIGHT

RELATIONSHIP BETWEEN COMPENSATION LAYER THICKNESS AND CRITICAL RESOLUTION

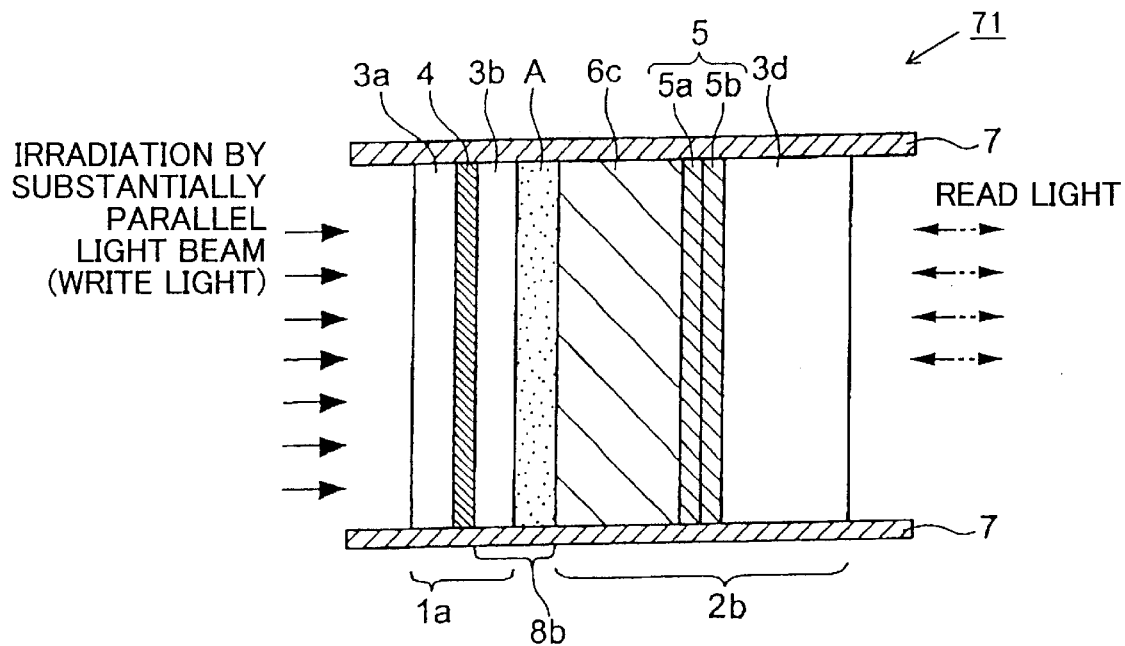
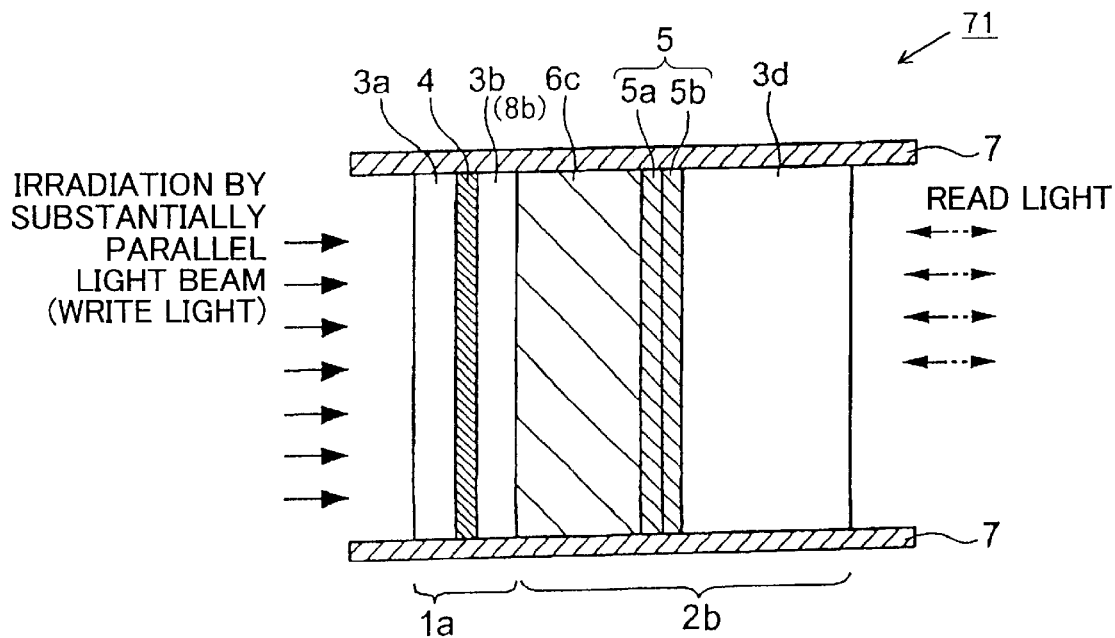

IRRADIATION BY SUBSTANTIALLY PARALLEL LIGHT BEAM (WRITE LIGHT)

READ LIGHT

CRITICAL RESOLUTION (lp/mm)

COMPENSATION LAYER THICKNESS (mm)

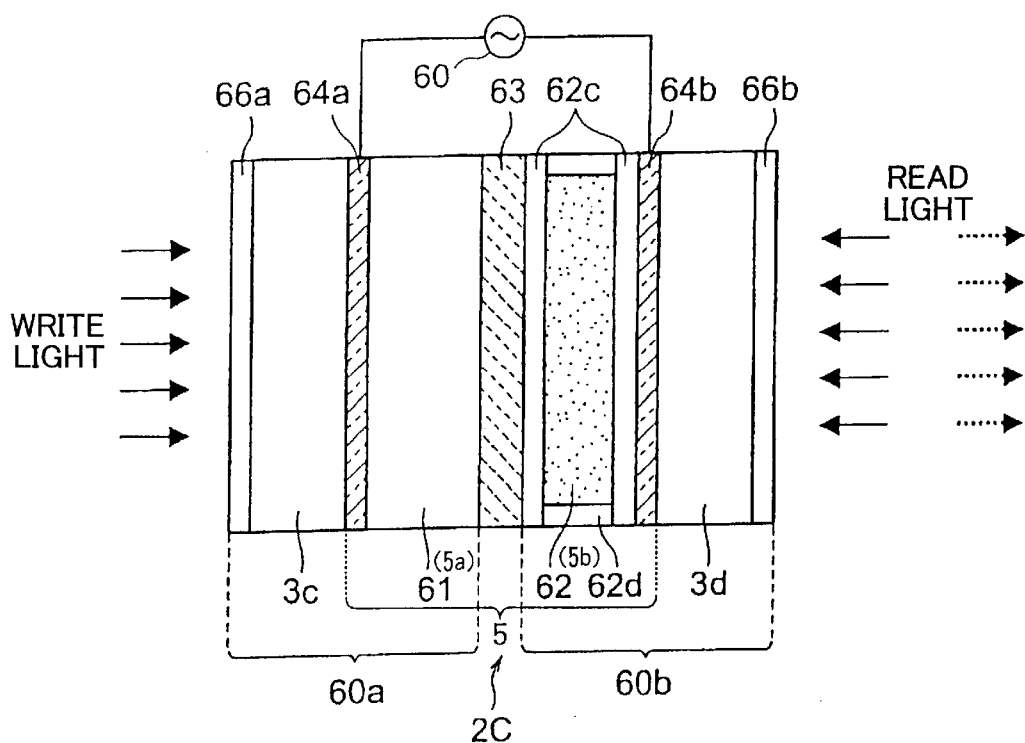
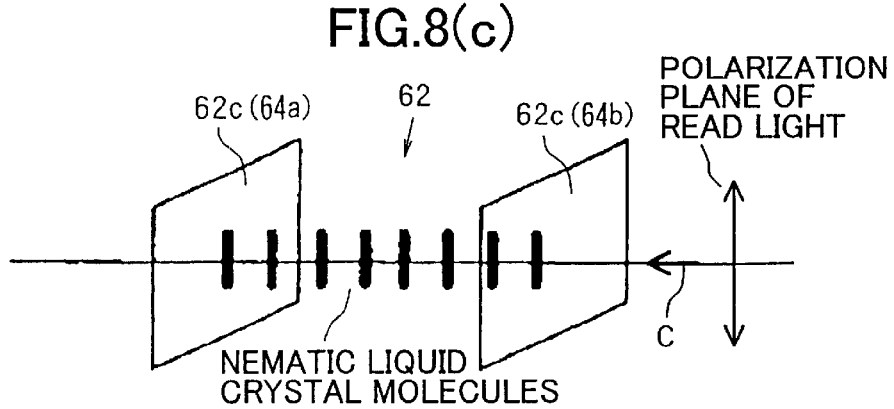
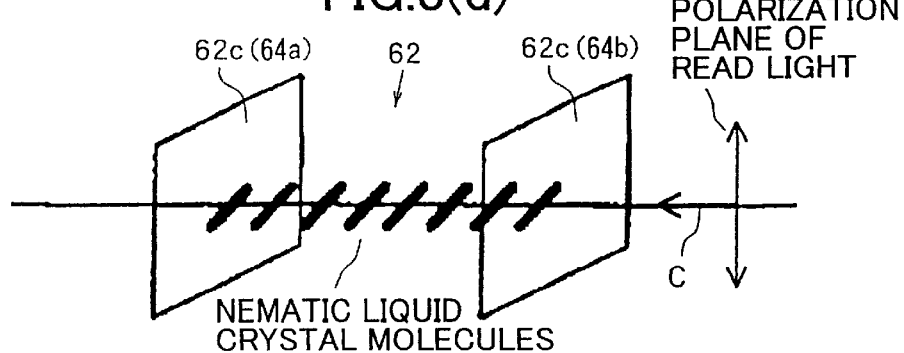

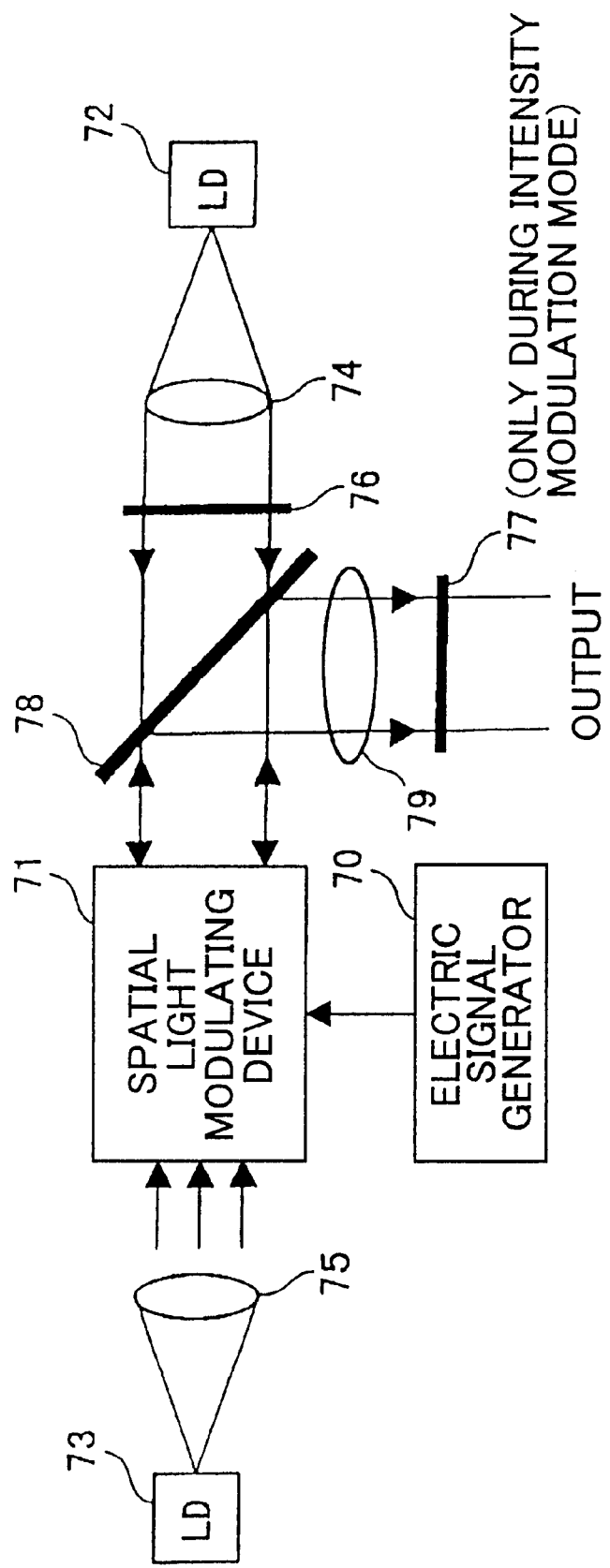

SPATIAL OPTICAL MODULATING DEVICE

TECHNICAL FIELD

The present invention relates to a spatial light modulating device which uses a spatial light modulator, which is an element for attaining a particular modulation in a cross-section of a light beam.

BACKGROUND ART

A spatial light modulating device is used for optical information processing and for computer-generated holograms (CGH). Especially, a spatial light modulating device of a type that prepares signal images according to electric addresses is very useful because this type of spatial light modulating device can easily prepare those signal images. A device that can efficiently perform phase modulation is required for the above-described usage.

A device that employs a transmission type liquid crystal element can be considered as an example of this type of spatial light modulating device. Such a device has a merit of being purchasable at a relatively low price. However, such a device generally employs twisted-nematic liquid crystal, and therefore is unable to attain a phaseonly modulation. Diffraction occurs due to the pixel structure of the transmission type liquid crystal element, and deteriorates the light using efficiency. The diffracted light becomes undesirable stray light.

As an example of another device that is capable of being electrically addressed, there is a spatial light modulating device that employs an optically-addressed type spatial light modulator and that employs an electrically-addressed type element to generate write light that will fall incident on the optically-addressed type spatial light modulator. In such a device, a small-sized cathode ray tube (CRT) or the transmission-type liquid crystal element can be used as the electrically-addressed element. The transmission-type liquid crystal element can be effectively used because it causes no image distortions and has high contrast characteristics. There is also known a spatial light modulating device that employs a transmission type liquid crystal element as an input device for inputting optical information for being processed and that employs an optically-addressed type parallel-aligned nematic-liquid-crystal spatial light modulator (PAL-SLM). The optically-addressed type PAL-SLM is a spatial light modulator of a type that employs parallel-aligned nematic-liquid-crystal as light modulation material. In this device, an imaging lens is disposed between the transmission type liquid crystal element and the optically-addressed type parallel-aligned nematic-liquid-crystal spatial light modulator. Write light from the transmission type liquid crystal element passes through the imaging lens to reach the optically-addressed type PAL-SLM. It is possible to attain phase modulation of $2\pi$ or greater by using the optically-addressed type SLM that employs the parallel-aligned nematic-liquid-crystal. Because phase-only modulation can be attained, it is also possible to attain high diffraction efficiency.

In this type of spatial light modulating device that employs the PAL-SLM, however, the lens is used as a device for transmitting an output image from the electrically-addressed element to the optically-addressed spatial light modulator. Because the lens generally has a long distance between an object plane and an image plane, the entire spatial light modulating device becomes large.

In order to solve this problem, as disclosed in Japanese unexamined patent application publication No.7-72503, for example, the size of the spatial light modulating device is made small by using a fiber optic plate (FOP) to transmit images.

The spatial light modulating device of this publication No.7-72503 will be described below with reference to the accompanying drawings.

FIG. 1 schematically shows the configuration of the spatial light modulating device that uses a fiber optic plate (FOP) to transmit images. In this spatial light modulating device, glass substrates 3a–3d are used as substrates of an electrically-addressed element 1a and an optically-addressed spatial light modulator 2a. The electrically-addressed element 1a has an image display portion 4 between its glass substrates 3a and 3b. The optically-addressed spatial light modulator 2a has a thin film material portion 5 between its glass substrates 3c and 3d. The electrically-addressed element 1a and the optically-addressed spatial light modulator 2a are coupled together by using a fiber optic plate (FOP) 6a.

This spatial light modulating device, however, has a problem that an image becomes blurred when the image is transmitted through the glass substrates 3b and 3c. It is conceivable to irradiate a parallel light beam onto the spatial light modulating device in order to solve this problem. This method can decrease the degree how the image is degraded while the image is transmitted through the glass substrate 3b. However, light which has passed through the fiber optic plate (FOP) 6a and outputted from the fiber optic plate (FOP) 6a is not a parallel light beam. Accordingly, the image borne on the light will be greatly degraded while the light is transmitted through the glass substrate 3c.

In order to solve this problem, the publication proposes another spatial light modulating device as shown in FIG. 2.

In this spatial light modulating device in FIG. 2, the fiber optic plate (FOP) is also used for transmitting images. In this spatial light modulating device, a fiber optic plate (FOP) 6b is used as a substrate of the electrically-adressed element 1b that faces the optically-addressed spatial light modulator 2b, while another fiber optic plate (FOP) 6c is used as a substrate of the optically-addressed spatial light modulator 2b that faces the electrically-adressed element 1b. With this structure, it is possible to greatly reduce the image degradation. It is possible to effectively use the spatial light modulating device as an optical amplifier in a projection device or the like.

In order to use such a spatial light modulating device to an optical information processing or a hologram, the output image from the spatial light modulating device is frequently subjected to Fourier transform operation using a lens or the like. However, the spatial light modulating device of FIG. 2 attains a high image transmission characteristic between the electrically-addressed element 1b and the optically-addressed spatial light modulator 2b. Accordingly, the image of the pixel structure of the electrically-addressed element 1b is accurately transmitted to the optically-addressed spatial light modulator 2b. If the output image from the spatial light modulating device is subjected to the Fourier transformation, diffraction phenomenon occurs due to the image of the pixel structure. As a result, the light using efficiency decreases. The diffraction phenomenon produces undesirable stray light.

DISCLOSURE OF THE INVENTION

The present invention is attained to solve the above-described described problems. It is an objective of the present invention to provide a spatial light modulating device that has a small size and that can greatly suppress the diffraction phenomenon that occurs due to the pixel structure.

In order to overcome the above-described problem, the present invention provides a spatial light modulating device, comprising: an electrically-addressed type element for being addressed by electric signals representing information to be written, the electrically-addressed type element including an image display portion having a pixel structure, the electrically-addressed type element being inputted with write light; an optically-addressed type spatial light modulator including a thin film material portion and a pair of substrates, the thin film material portion being provided between the pair of substrates, the thin film material portion having an optical addressing layer and a light modulation layer, the optically-addressed type spatial light modulator being inputted with read light, one of the pair of substrates that faces the electrically-addressed type element being constructed from a fiber optic plate; and a compensation layer having a predetermined thickness and provided between the image display portion and the fiber optic plate.

With this structure, it is possible to locate the image display portion and the thin film material portion with the predetermined distance therebetween. When write light from each pixel in the pixel structure of the image display portion passes through the compensation layer, the light spreads by an amount that corresponds to the predetermined thickness of the compensation layer, before reaching the thin film material portion.

It is preferable to set the predetermined distance to a predetermined value that corresponds to the pixel pitch defined in the pixel structure, for example. In this case, it is possible to transmit no pixel structure, and therefore it is possible to prevent diffraction phenomenon from occurring due to the pixel structure.

It is preferable that the spatial light modulating device of the present invention may further comprise: a write light source for producing the write light; and a read light source for producing the read light.

According to the spatial light modulating device of the present invention, it is preferable that the compensation layer has the thickness of an amount that causes the resolution of an output image to become smaller than a minimum resolution that is required to allow the pixel structure to appear in the output image.

With this structure, it is possible to erase the pixel structure from the output image. More specifically, the resolution of the output image (the degree how the output image is degraded) depends on the distance between the image display portion and the thin film material portion (thickness of the compensation layer). If this distance is too small, the resolution becomes high and causes the pixel structure to appear in the output image. On the other hand, if this distance is too long, the output image becomes degraded too much. Considering this, the thickness of the compensation layer is set so that the resolution of the output image will be smaller than the resolution, at which the pixel structure will appear in the output image. With this structure, it is possible to prevent diffraction phenomenon from occurring due to the pixel structure.

According to the present invention, one of the pair of substrates, in the optically-addressed type spatial light modulator, that faces the electrically-addressed type element is constructed from a fiber optic plate, the compensation layer being provided between the image display portion and the fiber optic plate.

The fiber optic plate has a distribution of refractive index, with which the fiber optic plate can transmit an input image while maintaining the resolution of the input image. Accordingly, using the fiber optic plate can decrease the thickness of the compensation layer. More specifically, in order to control the phase of light, the optically-addressed type spatial light modulator is required to have surfaces with a high precision. It is necessary to provide the thin film material portion between substrates with very large thickness (5 mm or 10 mm). In such a case, the thickness of the compensation layer will become large. Accordingly, when light is transmitted from the image display portion to the thin film material portion, the image borne on the light will be degraded too much. This degrades the performance of the spatial light modulating device. Contrarily, according to the present invention, by employing the above-described structure, it is possible to decrease the thickness of the compensation layer, and to solve the problem.

According to the present invention, the electrically-addressed type element may preferably include a transmission type liquid crystal element. By using the transmission type liquid crystal element as the electrically-addressed type element, it is possible to produce a write light that bears thereon signal images with little distortion.

According to the present invention, the optically-addressed type spatial light modulator may preferably include an optically-addressed type spatial light modulator that employs a photoconductive layer as the optical addressing layer and that employs a liquid crystal layer as the light modulation layer. By using the optically-adressed type spatial light modulator that employs a photoconductive layer as the optical addressing layer and that employs a liquid crystal layer as the light modulation layer, it is possible to attain high diffraction efficiency.

According to the present invention, the write light source may preferably include a semiconductor laser. By using the semiconductor laser as the write light source, it is possible to generate a parallel light beam more easily. As a result, it is possible to decrease the degree how the output image is degraded.

The spatial light modulating device of the present invention may preferably further comprise a holding portion holding both of the electrically-addressed type element and the optically-addressed spatial light modulator, the compensation layer including an air layer having the predetermined thickness. By adjusting the thickness of the air layer, it is possible to freely adjust the thickness of the compensation layer.

BRIEF DESCRIPTION OF THE DRAWINGS

FIG. 5(a) schematically shows the configuration of a spatial light modulating device according to a second embodiment of the present invention;

FIG. 5(b) schematically shows the configuration of a spatial light modulating device according to a modification of the second embodiment of the present invention;

FIG. 8(b) schematically shows the configuration of a parallel aligned nematic-liquid-crystal spatial light modulator (PAL-SLM) 2c in the third embodiment;

FIG. 8(c) illustrates the state how liquid crystal molecules are aligned in a liquid crystal layer of the parallel aligned nematic-liquid-crystal spatial light modulator of FIG. 8(b);

FIG. 8(d) shows how the aligned state of the liquid crystal molecules of FIG. 8(c) changes;

FIG. 9 shows the construction of a system, which employs the spatial light modulating device of the third embodiment;

BEST MODE FOR CARRYING OUT THE INVENTION

Figure 1:
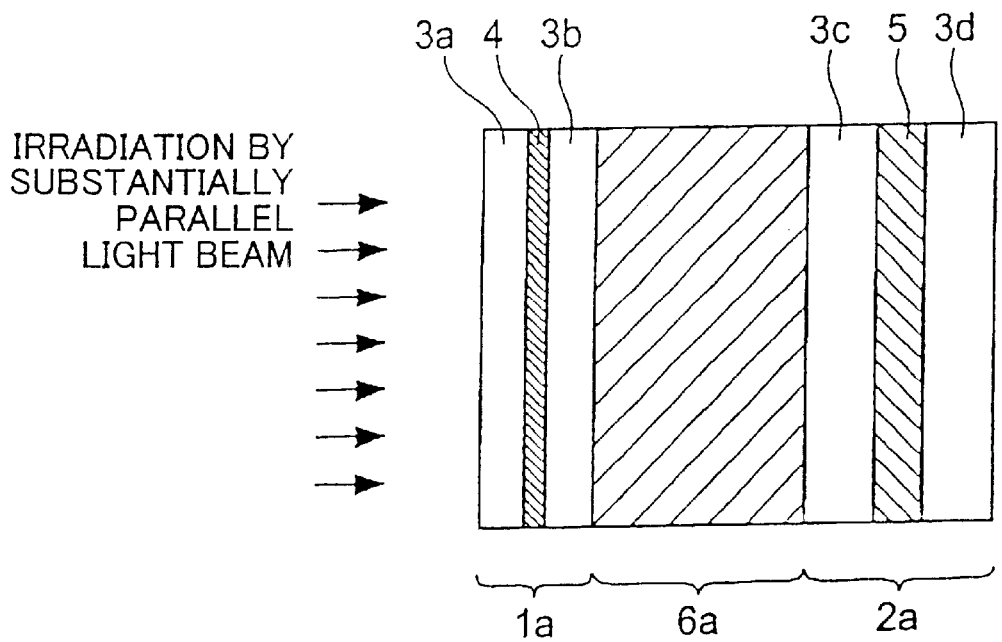
FIG. 1 schematically shows the configuration of a conventional spatial light modulating device, which employs a fiber optic plate (FOP) to transmit an image.
Figure 2:
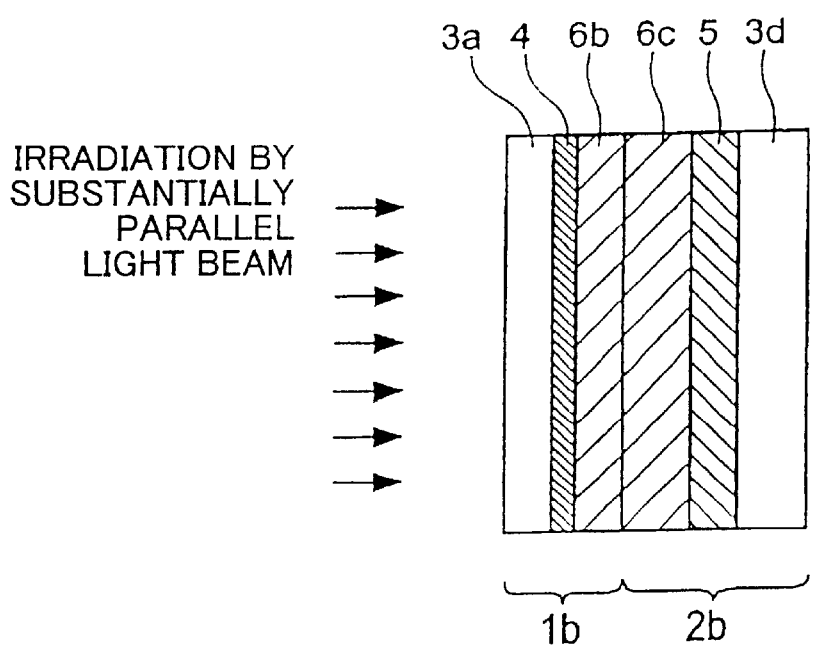
FIG. 2 schematically shows the configuration of another conventional spatial light modulating device, which employs fiber optic plates (FOPs) to transmit an image.

Spatial light modulating devices according to embodiments of the present invention will be described with reference to FIGS. 3 to 15(b).

It should be noted that in the explanation of the drawings, the same elements are added with the same numbering and redundant explanation is omitted. Also the dimensional rates used in the drawings do not always much those described.

(First Embodiment)

First, a spatial light modulating device according to a first embodiment of the present invention will be described with referring to FIGS. 3 to 4.

Figure 3:
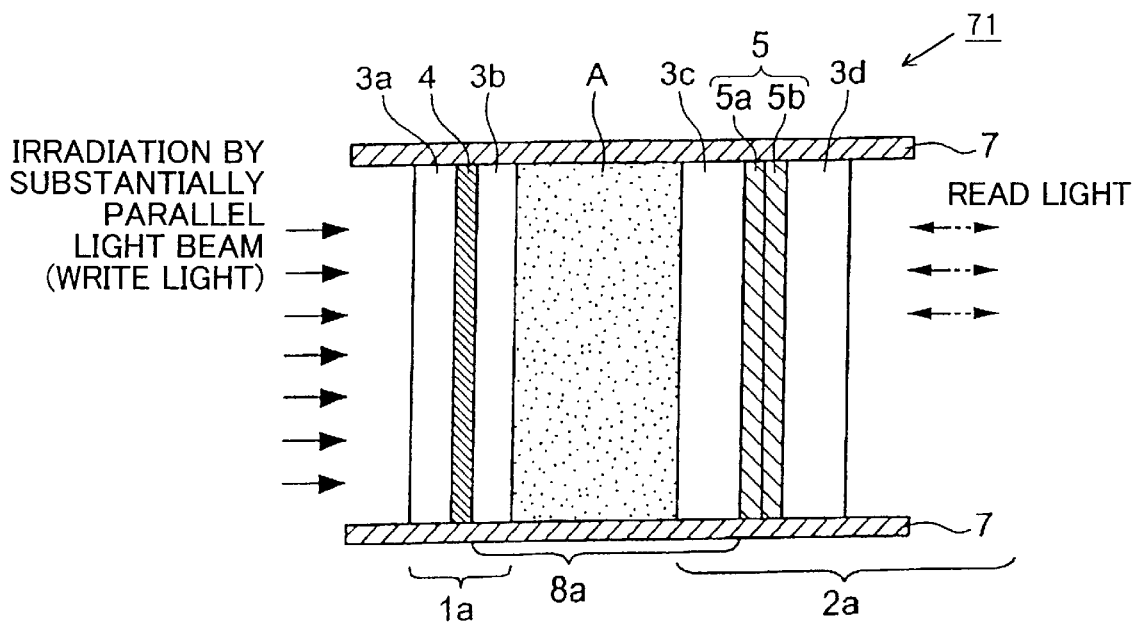
FIG. 3 schematically shows the configuration of a spatial light modulating device according to a first embodiment of the present invention.
Figure 4:
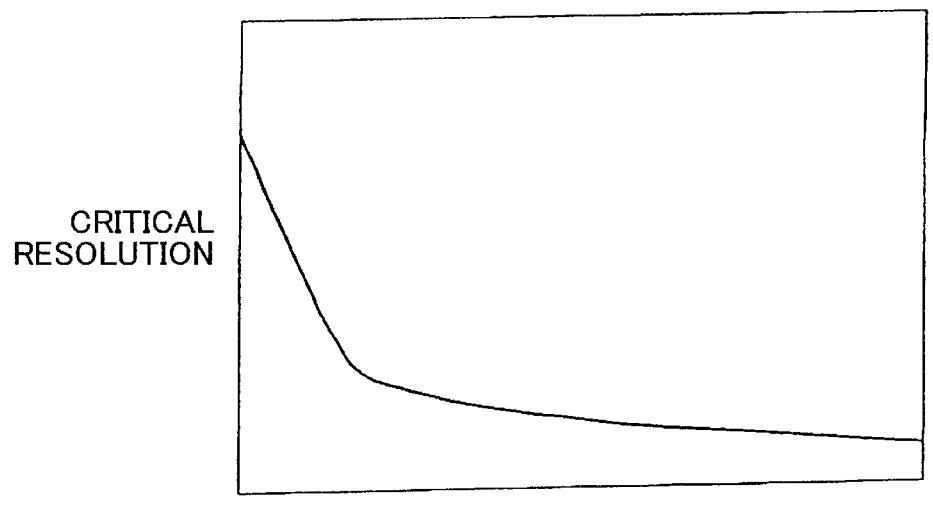
FIG. 4 is a graph showing the relationship between the compensation layer thickness and the critical resolution.

FIG. 3 is a schematic configurational view of the spatial light modulating device according to the first embodiment of the present invention.

In the spatial light modulating device 71, both of an electrically-addressed type element 1a and an optically-addressed type spatial light modulator 2a are held by a device-holder 7. A compensation layer 8a is provided between an image display portion 4 of the electrically-addressed type element 1a and a thin film material portion 5 of the optically-addressed type spatial light modulator 2a. In the first embodiment, the compensation layer 8a is made from: an air layer A, a glass substrate 3b, and another glass substrate 3c. Light substantially in a parallel beam shape is irradiated on the spatial light modulating device 71.

The electrically-addressed type element 1a includes: a pair of glass substrates 3a and 3b, and the image display portion 4. The image display portion 4 is sandwiched between the glass substrates 3a and 3b. The image display portion 4 has a pixel structure which defines a plurality of pixels. Each pixel is addressed by an electric signal, which is related to information desired to be written on the electrically-addressed type element 1a. Irradiation light (write light) falls incident on the image display portion 4 via the glass substrate 3a. The write light is modulated at the image display portion 4 according to the information, and thereafter outputs via the glass substrate 3b. The write light is then transmitted through the compensation layer 8a. Representative examples of the electrically-addressed type element 1a include: a transmission type liquid crystal element, and a cathode ray tube. In the case where the transmission type liquid crystal element is used as the electrically-addressed type element 1a, for example, the image display portion 4 includes a liquid crystal layer and a pixel structure. The pixel structure is constructed from a plurality of pixel electrodes. When the pixel electrodes are electrically addressed, the liquid crystal modulates the write light.

The optically-addressed type spatial light modulator 2a includes: a pair of glass substrates 3c and 3d, and the thin film material portion 5. The thin film material portion 5 is sandwiched between the glass substrates 3c and 3d. The thin film material portion 5 includes an addressing layer 5a and a light modulation layer 5b. The thin film material portion 5 is constructed by superposing the addressing layer 5a on the light modulation layer 5b. The optical addressing layer 5a is disposed on the glass substrate 3c, and the light modulation layer 5b is disposed on the glass substrate 3d. The write light, modulated by the electrically-addressed type element 1a, falls incident on the optical addressing layer 5a, via the glass substrate 3c, thereby changing the modulation state at the light modulation layer 5b. Read light falls incident on the light modulation layer 5b via the glass substrate 3d. The read light is modulated in the light modulation layer 5b, and reflects off a mirror layer (not shown) which is provided between the optical addressing layer 5a and the light modulation layer 5b. Thereafter, the read light is outputted via the glass substrate 3d. For example, the optically-addressed type spatial light modulator 2a is of a type that employs a photoconductive layer as the optical addressing layer 5a and that employs liquid crystal or electrooptic crystal as the light modulation layer 5b.

It is impossible to produce a completely parallel light beam even when an irradiation light source emits a substantially parallel light beam because the irradiation light source has a certain amount of light emission area. Accordingly, when the write light is transmitted through the compensation layer 8a, that is, between the image display portion 4 and the thin film material portion 5, the image borne on the write light becomes degraded. The degree how the image is degraded depends on: the degree how the light emitted from the irradiation light source is parallel; and the distance between the image display portion 4 and the thin film material portion 5, that is, the thickness of the compensation layer 8a. The relationship between the image degrading degree and the compensation layer thickness is represented by a graph shown in FIG. 4. In this figure, the horizontal axis denotes the thickness of the compensation layer 8a, and the vertical axis denotes the critical resolution. The critical resolution is the maximum spatial frequency of images that are capable of being transmitted by the compensation layer 8a. The degree of slant in the curve of the graph changes according to the degree how the irradiation beam is parallel. The degree how the image is degraded increases as the thickness of the compensation layer increases.

By setting the thickness of the compensation layer 8a to such an amount that causes the critical resolution to become smaller than the spatial frequency of the pixel structure in the electrically-addressed type element 1a, it is possible to greatly suppress the effect of diffraction that will occur due to the pixel structure. Because the compensation layer 8a includes the air layer A, it is possible to freely adjust the thickness of the compensation layer 8a.

In this way, according to the present embodiment, the substrate 3b of the electrically-addressed type element 1a is constructed from a glass plate, and the substrate 3c of the optically-addressed type spatial light modulator 2a is constructed from another glass plate. The write light passes through the compensation layer 8a, which includes the glass substrates 3b and 3c, before reaching the thin film material portion 5. The write light from each pixel of the image display portion 4 spreads in a proper degree that corresponds to the thickness of the compensation layer 8a, while the write light is being transmitted through the compensation layer 8a. Thereafter, the write light reaches the thin film material portion 5. In this way, it is possible to transmit images to the thin film material portion 5 in a properly-degraded state.

(Second Embodiment)

Next, a spatial light modulating device according to a second embodiment of the present invention will be described with reference to FIGS. 5(a) to 5(b).

FIG. 5(a) schematically shows the configuration of the spatial light modulating device 71 according to the second embodiment of the present invention.

The spatial light modulating device 71 of the present embodiment employs an optically-addressed type spatial light modulator 2b. The optically-addressed type spatial light modulator 2b is the same as the optically-addressed type spatial light modulator 2a in the first embodiment, except that a fiber optic plate (FOP) 6c is used, instead of the glass substrate 3c, as a substrate that is provided facing the electrically-addressed type element 1a. According to the present embodiment, a compensation layer 8b is made from the glass substrate 3b and an air layer A.

In this way, the spatial light modulating device 71 of the second embodiment employs the optically-addressed type spatial light modulator 2b whose substrate facing the electrically-addressed type element 1a is made from the fiber optic plate (FOP) 6c. In order to control the phase of light by using the spatial light modulating device 71, the optically-addressed type spatial light modulator is generally required to have surfaces with a high precision. Accordingly, it is necessary to provide the thin film material portion between substrates with very large thickness (5 mm or 10 mm). According to the present embodiment, by constructing the substrate 6c from the fiber optic plate (FOP), it is possible to reduce the thickness of the compensation layer 8b in comparison with the case where the glass substrate is used. Accordingly, the image borne on light will not be degraded too much when the light is being transmitted between the image display portion 4 and the thin film material portion 5. It is possible to control the phase of light without degrading the performance of the spatial light modulating device 71. Because the compensation layer 8b includes the air layer A, it is possible to freely adjust the thickness of the compensation layer 8b.

It is possible to set the thickness of the air layer A substantially to a zero (0) value, for example. In this case, as shown in FIG. 5(b), the glass substrate 3b becomes in direct contact with the fiber optic plate (FOP) 6c. The thickness of the compensation layer 8b becomes exactly the same with the thickness of the glass substrate 3b.

In this way, according to the present embodiment, the substrate 3b of the electrically-addressed type element 1a is constructed from the glass substrate, while the substrate 6c of the optically-addressed type spatial light modulator 2b is constructed from the fiber optic plate (FOP). Accordingly, the write light is transmitted through the compensation layer 8b, which includes the glass substrate 3b, before reaching the FOP 6c. Accordingly, the write light from each pixel of the image display portion 4 spreads in a proper amount that corresponds to the thickness of the compensation layer 8b, while the write light is being transmitted through the compensation layer 8b. Thereafter, the write light passes through the fiber optic plate (FOP) 6c, and then finally reaches the thin film material portion 5. In this way, it is possible to transmit an image, which is degraded in a proper degree, to the thin film material portion 5.

Especially, in the case where the electrically-addressed type element 1a is an intensity modulation device, the electrically-addressed type element 1a is not required to have surfaces with high precision. The thickness of the glass substrate 3b, which constitutes the compensation layer 8b, can be made small. By reducing the total width of the compensation layer 8b, it is possible to degrade the image in a desired degree.

It is conceivable to construct the substrate 3b of the electrically-addressed type element 1a from a fiber optic plate (FOP) and to construct the substrate 6c of the optically-addressed type spatial light modulator 2b from a glass substrate. This construction is, however, undesirable. This is because in this case, write light passes through the fiber optic plate (FOP), before reaching the glass substrate. After light passes through the fiber optic plate (FOP), the light becomes scattering light. Accordingly, the image borne on the light will be degraded too much. Especially if the optically-addressed type spatial light modulator 2b is a phase modulation device, the phase modulation device is required to have surfaces with high precision. Accordingly, the glass substrate of the optically-addressed type spatial light modulator 2b needs to have a relatively large thickness. The scattering light outputted from the fiber optic plate (FOP) will pass through the thick glass plate. This results in that the image borne on the light will be degraded quite too much.

(Third Embodiment)

Next, a spatial light modulating device according to a third embodiment of the present invention will be described with reference to FIGS. 6 to 14.

Figure 6:
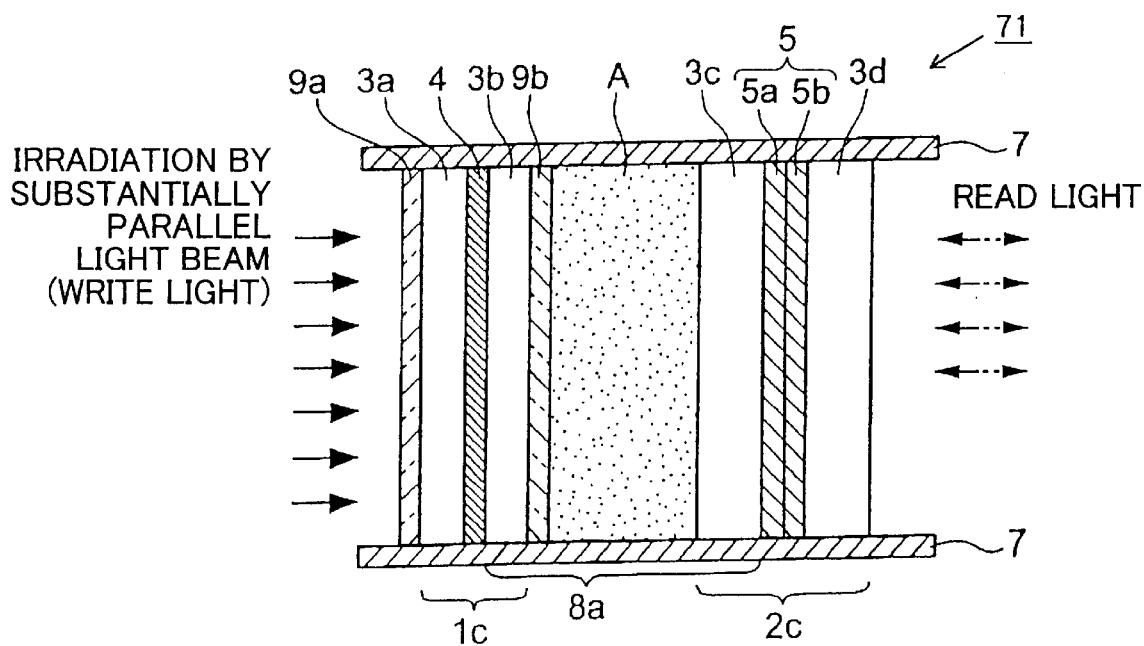
FIG. 6 schematically shows the configuration of a spatial light modulating device according to a third embodiment of the present invention.

FIG. 6 schematically shows the configuration of the spatial light modulating device 71 according to the third embodiment of the present invention.

According to the third embodiment, a parallel-aligned nematic-liquid-crystal spatial light modulator (PAL-SLM) 2c is employed as the optically-addressed type spatial light modulator. The parallel-aligned nematic-liquid-crystal spatial light modulator (PAL-SLM) 2c includes: the pair of glass substrates 3c and 3d, and the thin film material portion 5. The thin film material portion 5 is sandwiched between the pair of glass substrates 3c and 3d. The thin film material portion 5 includes: the optical addressing layer 5a and the light modulation layer 5b. A transmission type liquid crystal element (liquid crystal television (LCTV)) 1c is employed as the electrically-addressed type element. The transmission type liquid crystal element (LCTV) 1c has 128×128 pixels with a pixel pitch P of 200 μm, and has a diagonal size of 1.4 inches. The transmission type liquid crystal element (LCTV) 1c employs twisted-nematic (TN) liquid crystal as modulation material. The transmission type liquid crystal element (LCTV) 1c includes: the pair of glass substrates 3a and 3b, and the image display portion 4. The image display portion 4 is sandwiched between the pair of glass substrates 3a and 3b. According to the present embodiment, because the transmission type liquid crystal element (LCTV) 1c employs the twisted-nematic (TN) liquid crystal, it is necessary to provide polarization plates on both sides of the twisted-nematic (TN) liquid crystal in order to perform an image display operation. Accordingly, a polarization plate 9a is provided on the input side of the glass substrate 3a, and another polarization plate 9b is provided on the output side of the glass substrate 3b.

The compensation layer 8a is provided between the image display portion 4 and the thin film material portion 5. The compensation layer 8a is made from: an air layer A, the glass substrate 3b, the polarization plate 9b, and the glass substrate 3c.

In this way, by using the transmission type liquid crystal element as the electrically-addressed type element, it is possible to produce write light that bears thereon signal images with little distortion. By using the optically-addressed type spatial light modulator that employs a photoconductive layer as the optical addressing layer and that employs a liquid crystal layer as the light modulation layer, it is possible to attain high diffraction efficiency.

Each of the glass substrates 3a and 3b of the transmission type liquid crystal element (LCTV) 1c has thickness of 0.5 mm. Each of the glass substrates 3c and 3d of the parallel-aligned nematic-liquid-crystal spatial light modulator (PAL-SLM) 2c has thickness of 1 mm. Each of the polarization plates 9a and 9b has thickness of 0.3 mm. The air layer A is provided between the polarization plate 9b and the parallel-aligned nematic-liquid-crystal spatial light modulator (PAL-SLM) 2c. By using the air layer A, it is possible to adjust the thickness of the compensation layer 8a. In other words, because the compensation layer 8a includes the air layer A, it is possible to freely adjust the thickness of the compensation-layer 8a.

As the write light source, a combination of a single-mode red semiconductor laser (LD) and a collimator lens with f100 is used. The single-mode red semiconductor laser (LD) has an oscillation wavelength of 660 nm. The collimator lens converts the light from the semiconductor laser into a substantially parallel light beam.

Figure 7:
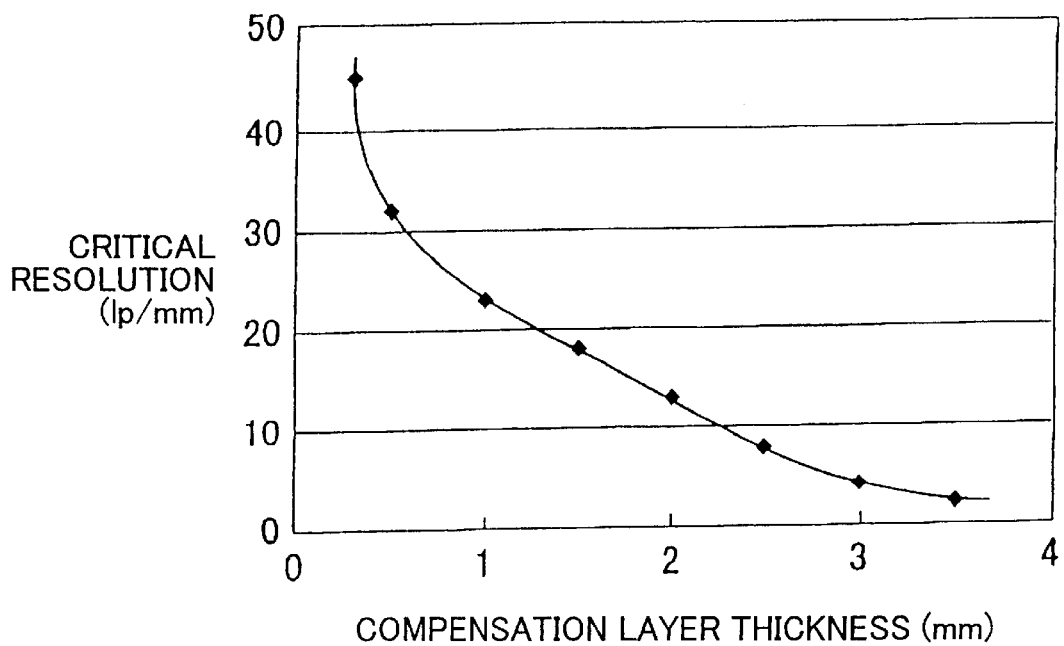
FIG. 7 is a graph showing the relationship between the compensation layer thickness and the critical resolution.

When the above-described light source is used, the relationship between the compensation layer thickness and the critical resolution, capable of being transmitted by the compensation layer, is represented by the graph of FIG. 7. In this example, the pixel pitch P has the spatial frequency f (=1/P) equal to 5 (lp/mm). Accordingly, by setting the compensation layer thickness to about 3 mm, it is possible to erase the pixel structure. In the present embodiment, the compensation layer 8a is constructed from: the glass substrate 3b, the glass substrate 3c, the air layer A, and the polarization plate 9b. Because the total thickness of the glass substrate 3b, the glass substrate 3c, and the polarization plate 9b is 1.8 mm, the thickness of the air layer A is set to 1.2 mm.

With this structure, it is possible to erase the pixel structure from the output image. More specifically, the resolution of the output image (the degree how the output image is degraded) depends on the distance between the image display portion and the thin film material portion (thickness of the compensation layer). If this distance is too small, the resolution becomes high and causes the pixel structure to appear in the output image. On the other hand, if this distance is too long, the output image will be degraded too much. Considering this, the thickness of the compensation layer is set so that the resolution of the output image will be smaller than the resolution, at which the pixel structure appears in the output image. With this structure, it is possible to prevent the diffraction phenomenon from occurring due to the pixel structure.

Next, the structure of the transmission type liquid crystal element (LCTV) 1c will be described with reference to FIG. 8(a).

In the electrically addressing transmission type liquid crystal element (LCTV) 1c, the image display portion 4 is constructed from: a counter electrode 410, a silicon single crystal film 402, and a twisted nematic liquid crystal layer 411. The counter electrode 410 is formed on the glass substrate 3a. The silicon single crystal film 402 is formed on the glass substrate 3b. The twisted nematic liquid crystal layer 411 is formed between the counter electrode 410 and the silicon single crystal film 402. A pixel structure 415 having the predetermined pitch P is formed on the silicon single crystal film 402. Explained more detail, a plurality of transparent pixel electrodes 403 are arranged in a two dimensional matrix at the pitch P (200 μm) on the silicon single crystal film 402. It should be noted that although 3×3 transparent pixel electrodes 403 are shown in FIG. 8(a), 128×128 transparent pixel electrodes 403 are actually provided. A switching element 404, formed from a thin film transistor TFT, is connected to each transparent pixel electrode 403. Each switching element 404 is covered by a light blocking mask (not shown). Each transparent pixel electrode 403 functions as an opening portion with respect to write light. Each switching element 404 functions as a light blocking portion for blocking the write light. With this configuration, the pixel structure 415 has a plurality of opening portions 403 which are arranged at the pitch P.

Each switching element 404 is connected to a scan circuit 407 via a scan line 405, and is connected to a signal circuit 408 via a signal line 406. The scan circuit 407 and the signal circuit 408 are connected to an electric signal generator 70. With this configuration, the scan circuit 407 and the signal circuit 408 generate a scan signal and an image signal, according to a video signal supplied from the electric signal generator 70. The scan circuit 407 and the signal circuit 408 drive a desired switching element 404 by the scan signal and the image signal, to thereby select a corresponding pixel 403.

With this configuration, in the liquid crystal layer 411, the alignment of liquid crystal molecules changes in the regions, between the counter electrode 410 and some pixels 403 that are driven in accordance with the video signal from the electric signal generator 70. As a result, the polarization state of the incident write light is modulated. By using the operation of the polarizing plates 9a and 9b, the intensity of the write light is modulated so that a corresponding signal image is borne on the write light.

FIG. 8(b) schematically shows the structure of the parallel-aligned nematic-liquid-crystal spatial light modulator (PAL-SLM) 2c in the present embodiment.

In the parallel-aligned nematic-liquid-crystal spatial light modulator (PAL-SLM) 2c, the thin film material portion 5 is constructed from: a transparent electrode 64a, another transparent electrode 64b, a photoconductive layer 61, a dielectric multi-layer film mirror 63, and a liquid crystal layer 62. The transparent electrode 64a is formed on the glass substrate 3c. The other transparent electrode 64b is formed on the glass substrate 3d. The photoconductive layer 61, the dielectric multi-layer film mirror 63, and the liquid crystal layer 62 are provided between the transparent electrodes 64a and 64b. The photoconductive layer 61 serves as the optical addressing layer 5a, while the liquid crystal layer 62 serves as the light modulation layer 5b. An anti-reflection coating 66a is formed on a surface of the glass substrate 3c that faces the air layer A (FIG. 6). The anti-reflection coating 66a is for preventing the glass substrate 3c from reflecting off the write light from the transmission type liquid crystal element (LCTV) 1c. Similarly, another anti-reflection coating 66b is formed on the external surface of the glass substrate 3d in order to prevent the glass substrate 3b from reflecting off the read light.

With this structure, the optically-addressed type parallel-aligned nematic-liquid-crystal spatial light modulator 2c has a write portion 60a and a read portion 60b, which are separated from each other by the dielectric multi-layer film mirror 63. The write portion 60a is configured from: the photoconductive layer 61, the transparent electrode 64a, the glass substrate 3c, and the anti-reflection coating 66a. The glass substrate 3c and the anti-reflection coating 66a serve as a write light input end. In the write portion 60a with this structure, the write light will pass through the anti-reflection coating 66a and the glass substrate 3c, and will be irradiated on the photoconductive layer 61. The read portion 60b is configured from: the liquid crystal layer 62, the transparent electrode 64b, the glass substrate 3d, and the anti-reflection coating 66b. The glass substrate 3d and the anti-reflection coating 66b serve as a read light input end.

It is desirable that indium-tin-oxide (ITO) is used for the transparent electrodes 64a and 64b. A multi-layer film is provided, as the dielectric multi-layer film mirror 63, to reflect light of a predetermined wavelength region that corresponds to the wavelength of the read light. Thus, the dielectric multi-layer film mirror 63 reflects off the read light to output the read light from the SLM 2c.

The photoconductive layer 61 is preferably made from amorphous silicon. The photoconductive layer 61 has photoconductivity. That is, the crystal structure of the photoconductive layer 61 reversibly changes when the photoconductive layer 61 is irradiated with light in a particular wavelength region. The impedance of the photoconductive layer 61 changes according to changes in brightness of the incident light. Thus, the photoconductive layer 61 exhibits electric conductivity. It should be noted that if necessary, a light blocking layer can be imposed between the photoconductive layer 61 and the dielectric multi-layer film mirror 63.

It is preferable to use nematic liquid crystal as the liquid crystal layer 62. The liquid crystal layer 62 is disposed and fixed by alignment layers 62c and spacers 62d. The alignment layers 62c are positioned on both sides of the liquid crystal layer 62. Polyimide or the like, for example, is used as the alignment layers 62c. The alignment layers 62c cause the liquid crystal molecules, in the liquid crystal layer 62, to be uniformly aligned in parallel with the transparent electrodes 64a, 64b without being twisted. Accordingly, in an off condition wherein no write light falls incident on the photoconductive layer 61, liquid crystal molecules are aligned in parallel with the transparent electrodes 64a, 64b without any twisting as shown in FIG. 8(c).

When write light falls incident on the write portion 60a, the crystal structure of the photoconductive layer 61 changes and the electric resistance of the photoconductive layer 61 changes. Because an alternating-current voltage of several volts is applied between the transparent electrodes 64a and 64b by an alternating-current power supply 60, when the electrical resistance of the photoconductive layer 61 changes, the amount of the voltage applied through the liquid crystal layer 62 also changes. The change in voltage applied through the liquid crystal layer 62 changes the tilted amounts of the liquid crystal molecules, which in turn changes the index of refraction of the liquid crystal layer 62. As a result, read light (more specifically, read light inputted via the glass substrate 3d, and read light reflected from the dielectric multi-layer film mirror 63) is changed, and is outputted from the PAL-SLM 2c as a phase-modulated image.

More specifically, the change in voltage applied through the liquid crystal layer 62 tilts the liquid crystal molecules in the propagation direction C of the read light as shown in FIG. 8(d). This causes changes in the refractive index in the liquid crystal layer 62 (Electrically Controlled Birefringence (ECB) effect). When the read light propagates through the liquid crystal layer 62, the liquid crystal layer 62 modulates, according to the electrically-controlled birefringence effect, the phase of the polarization plane, of the read light, that is parallel with the alignment direction of the liquid crystal molecules. The change in the refractive index, however, does not cause phase modulation in the other polarization plane that is perpendicular with the alignment direction of the liquid crystal molecules. The read light reflects off the dielectric multi-layer film mirror 63, again propagates through the liquid crystal layer 62, and then finally outputs as a phase-modulated image via the glass substrate 3d and the anti-reflection coating 66b.

Next, FIG. 9 shows the configuration of a system, which employs the spatial light modulating device 71.

A computer-generated hologram calculated by a computer is a representative example of information to be transmitted using this system. Such information is converted by the electric signal generator 70 into a video signal, and is supplied to the transmission type liquid crystal element (LCTV) 1c in the spatial light modulating device 71. As a result, the LCTV 1c, which has the pixel structure, produces a signal image. According to the present embodiment, the electrically-addressed transmission type liquid crystal element 1c, shown in FIG. 8(a), is used as the electrically-addressed type element. Such a transmission type liquid crystal element is particularly preferable because it has no image distortion and it has high contrast characteristics. It is noted, however, that the electrically-addressed type element 1c may be constructed from transmission type liquid crystal elements of other types, cathode ray tubes, or the like.

A semiconductor laser 73 is located at a position that confronts a write light incident surface (polarization plate 9a in the LCTV 1c) of the spatial light modulating device 71. Another semiconductor laser 72 is located at a position that confronts a read light incident surface (anti-reflection coating 66b on the glass substrate 3d of the PAL-SLM 2c) of the spatial light modulating device 71. The semiconductor laser 73 is used as the write light source, while the semiconductor layer 72 is used as the read light source. Both of the semiconductor lasers 72 and 73 are semiconductor lasers (LDs) with oscillation wavelength of 660 nm.

A collimator lens 75 is located between the semiconductor laser 73 and the spatial light modulating device 71. Another collimator lens 74 is located between the semiconductor laser 72 and the spatial light modulating device 71. Thus, the laser light from each of the semiconductor lasers 72 and 73 is converted into a parallel beam by a corresponding collimator lens 74, 75.

A polarization plate 76 and a half mirror 78 are provided between the collimator lens 74 and the spatial light modulating device 71. If necessary, a lens 79 is additionally provided at the rear side of the half mirror.

In this way, by using the semiconductor laser as the write light source, it is possible to easily produce a parallel light beam. It is therefore possible to reduce the degree how the output image is degraded.

The image produced by the electric signal generator 70 and inputted into the spatial light modulating device 71 is displayed by the transmission type liquid crystal element (LCTV) 1c, and is transmitted, as a modulated write light, through the compensation layer 8a (FIG. 6) onto the parallel-aligned nematic-liquid-crystal spatial light modulator (PAL-SLM) 2c. The PAL-SLM 2c modulates read light according to information of the signal image borne on the modulated write light. In this way, the signal image information, borne on the modulated write light, is read out from the PAL-SLM 2c as a modulated image by the read light which is reflected in the PAL-SLM 2c. The signal image information is then reflected at the half mirror 78 and is outputted in a predetermined direction.

The PAL-SLM 2c is in a phase-modulation mode to perform phase-only modulation onto the read light when the polarization plate 76 is disposed in an orientation that the polarization direction of the polarization plate 76 is parallel with the alignment direction of the liquid crystal molecules (that is, alignment direction of the liquid crystal molecules in the off state shown in FIG. 8(c)) in the PAL-SLM 2c. The PAL-SLM 2c is in an intensity-modulation mode to perform intensity modulation onto the read light when the polarization plate 76 is disposed in an orientation that the polarization direction of the polarization plate 76 is shifted at a 45 degree angle with respect to the alignment direction of the liquid crystal molecules (that is, alignment direction of the liquid crystal molecules in the off state in FIG. 8(c)) in the PAL-SLM 2c. During the intensity modulation mode, another polarization plate 77 is additionally provided in a position that the read light, which is outputted from the spatial light modulating device 71 and which reflects off the half mirror 78, will pass through the polarization plate 77. The polarization plate 77 is disposed in a cross-nicol orientation so that the polarization direction of the polarization plate 77 is shifted by a 90 degree angle from the polarization direction of the polarization plate 76.

Figure 10:
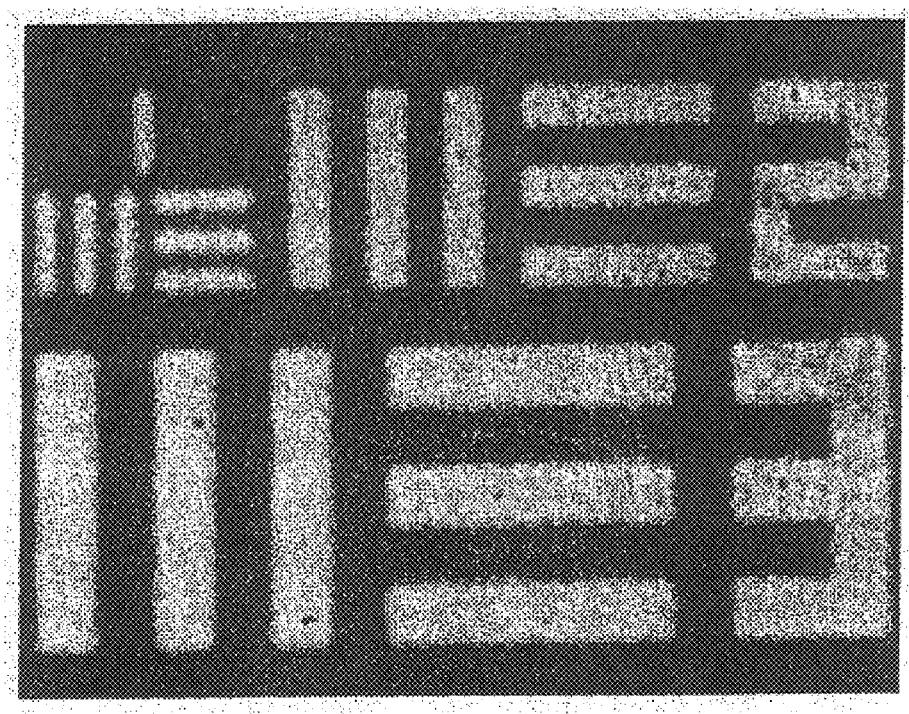
FIG. 10 is an output image, outputted from the system, which employs the spatial light modulating device according to the third embodiment, and picked up by a CCD camera.

FIG. 10 shows an output image, which was obtained by this system and picked up by a CCD camera. In this case, the spatial light modulating device 71 was operated in the intensity modulation mode. The polarization plate 77 was provided. An imaging lens (magnification lens, for example) was located as the lens 79 at the position between the half mirror 78 and the polarization plate 77. The CCD camera was located on the image plane of the lens.

Figure 11:
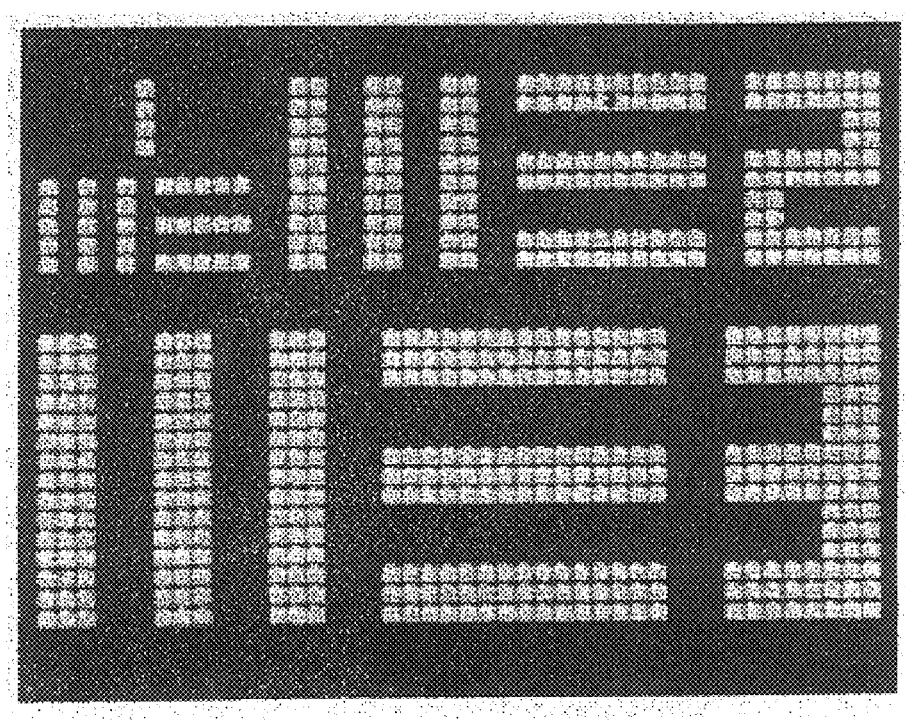
FIG. 11 is an output image, outputted from the transmission type liquid crystal element (LCTV) and picked up by a CCD camera.

For comparison, FIG. 11 shows an output image, which was obtained by the transmission type liquid crystal element (LCTV) 1c and picked up by the CCD camera. As apparent from this drawing, the LCTV 1c displays, in its output image, vertical and horizontal stripes with one pixel's worth of width, with two pixels' worth of width, and with three pixels' worth of width.

As apparent from FIG. 11, the pixel structure appears clearly in the output image of the transmission type liquid crystal element (LCTV) 1c. On the other hand, as shown in FIG. 10, the pixel structure does not appear in the output image of the spatial light modulating device 71 of the present embodiment. However, the vertical and horizontal stripes with one pixel's worth of width are clearly reproduced in the output image of the spatial light modulating device 71. It is apparent that the spatial light modulating device of the present embodiment can effectively erase the pixel structure from its output image.

More specifically, according to the present embodiment, the spatial frequency of the pixel structure 415, which has the pixel pitch P, is represented by 1/P=5 (lp/mm). The vertical and horizontal stripes with one pixel's worth of width are produced by displaying white and black pixel dots in alternation by the plural transparent pixel electrodes 403 in the pixel structure 415 of FIG. 8(a). Accordingly, the spatial frequency of the vertical and horizontal stripes with one pixel's worth of width is represented by ½ P=2.5 (lp/mm). According to the present embodiment, because the thickness of the compensation layer 8a is set to about 3 mm, the critical resolution (maximum spatial frequency capable of being transmitted) is set to about 4 (lp/mm) as shown in FIG. 7. Accordingly, the relationship of "½ P<critical resolution<1/P" is satisfied. It is therefore possible to erase the image of the pixel structure 415, which has the spatial frequency of 1/P. It is possible to accurately transmit images of horizontal and vertical stripes with one pixel's worth of width, which have the spatial frequency of ½ P. It is possible to transmit the image displayed by the pixel structure 415 without any degradation, while erasing the image of the pixel structure 415, per se.

Figure 12:
FIG. 12 shows an input image inputted to the spatial light modulating device according to the third embodiment.
Figure 13:
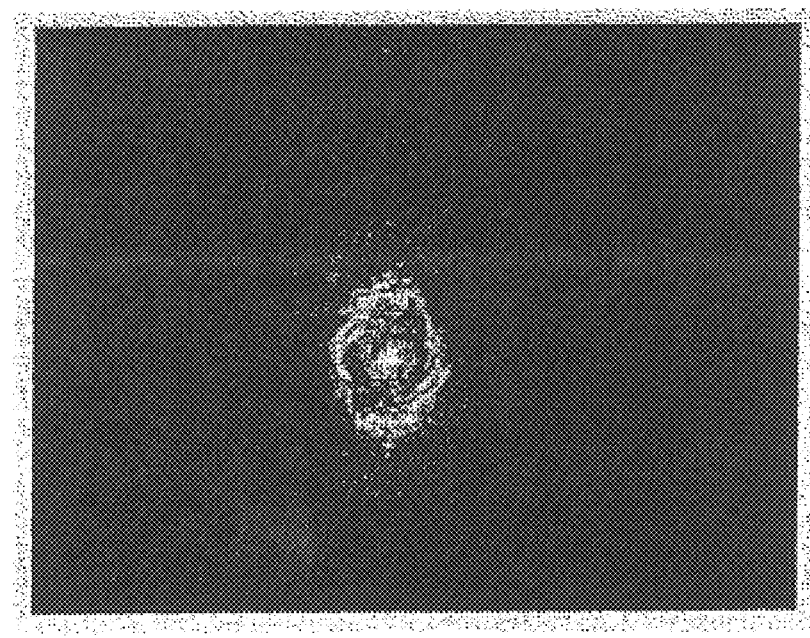
FIG. 13 is a Fourier transform image obtained during a phase modulation mode.
Figure 14:
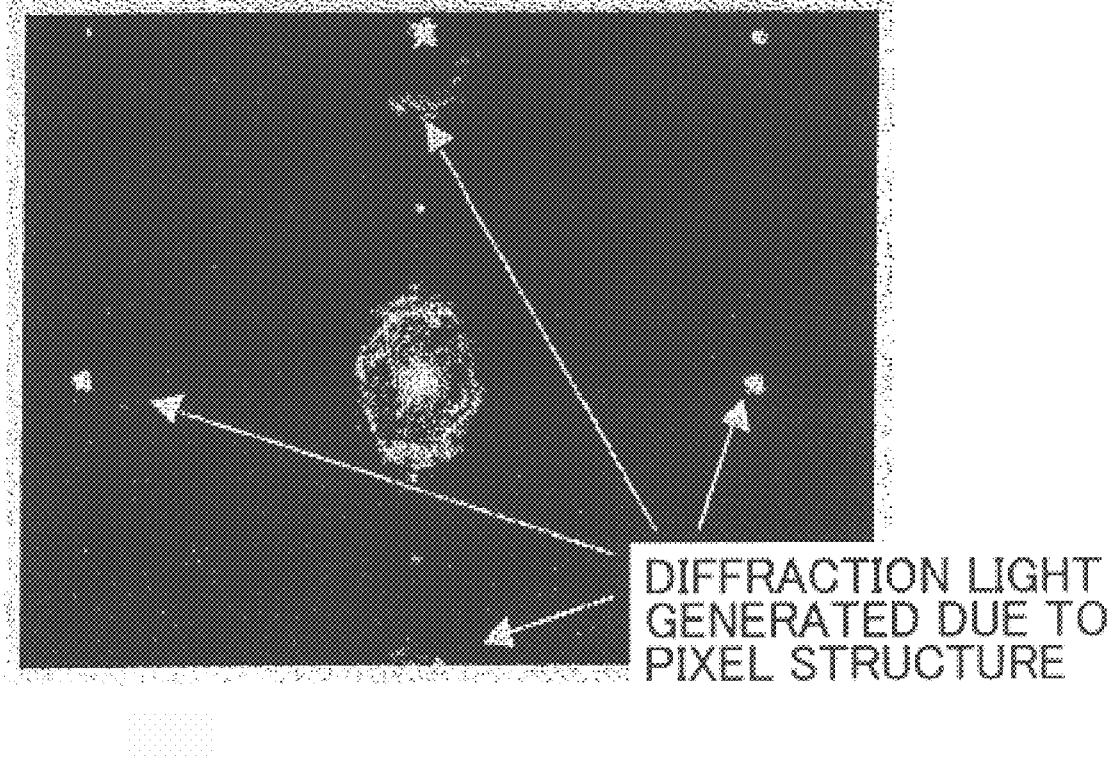
FIG. 14 shows a resultant image obtained by Fourier transforming an output image from the transmission type liquid crystal element (LCTV)

Next, in the system with the above-described structure, the spatial light modulating device 71 was brought into the phase modulation mode. A Fourier transform lens was located as the lens 79. A Fourier transform image was observed on the Fourier transform plane (rear focal plane) of the Fourier transform lens 79. FIGS. 12–14 show how the observation was achieved. In this case, the polarizer 77 was not provided. A fingerprint image shown in FIG. 12 was used as an input image. FIG. 13 shows a Fourier transform image of an output image from the spatial light modulating device 71. For comparison, the output image from the transmission type liquid crystal element (LCTV) 1c was directly Fourier transformed. The obtained Fourier transform image is shown in FIG. 14.

As shown in FIG. 14, in the Fourier transform image of the output image from the LCTV 1c, diffraction patterns occur due to the pixel structure. Contrarily, in the Fourier image of the output image from the spatial light modulating device 71 of the present embodiment, almost no diffraction pattern is observed due to the pixel structure as shown in FIG. 13. It is therefore apparent that the spatial light modulating device of the present embodiment can effectively erase the pixel structure from the output image, thereby greatly reducing the diffraction phenomenon.

In this way, according to the present embodiment, the substrate 3b of the LCTV 1c is made from a glass substrate, and the substrate 3c of the parallel-aligned nematic-liquid-cyrstal spatial light modulator (PAL-SLM) 2c is made also from a glass substrate. The write light passes through the compensation layer 8a, which includes the glass substrates 3b and 3c and the polarizer 9b, before reaching the photoconductive layer 61 in the thin film material portion 5. The write light from each pixel 403 in the image display portion 4 spreads by an amount corresponding to the thickness of the compensation layer 8a while passing through the compensation layer 8a, before reaching the photoconductive layer 61. Accordingly, the write light is transmitted to the photoconductive layer 61 in such a state that the image borne on the write light is properly degraded.

Thus, according to the spatial light modulating device of the present embodiment, it is possible to realize an electrically-addressed spatial light modulating device, which does not use a lens for transmitting images and therefore which has a compact size and which attains high performance.

In the present embodiment, the polarizers 9a and 9b need to be provided in the spatial light modulating device because the image input portion is constructed from the transmission type liquid crystal element (LCTV) 1c that employs the twisted nematic liquid crystal. However, by constructing the image input portion from other transmission type liquid crystal elements (LCTVs) that employ guest-host type liquid crystal, polymer dispersed liquid crystal (PDLC), or the like, it is possible to realize a spatial light modulating device that needs no polarizers.

(Fourth Embodiment)

Next, a spatial light modulating device according to a fourth embodiment of the present invention will be described with reference to FIGS. 15(a) and 15(b).

Figure 15A:
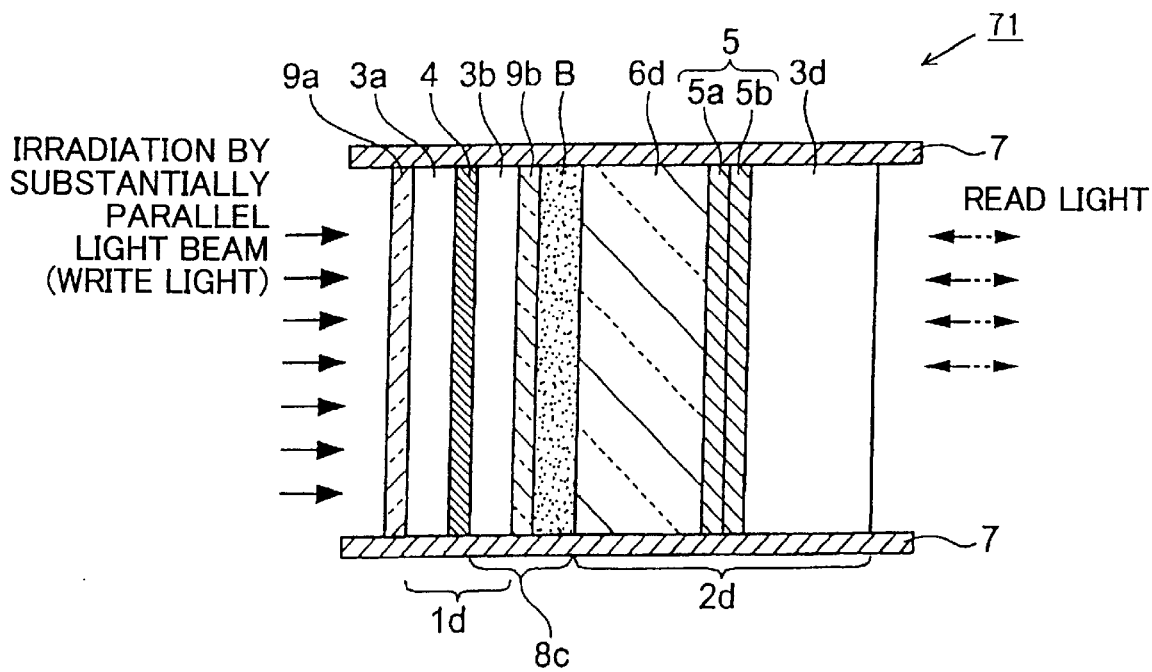
FIG. 15(a) schematically shows the configuration of a spatial light modulating device according to a fourth embodiment of the present invention.
Figure 15B:
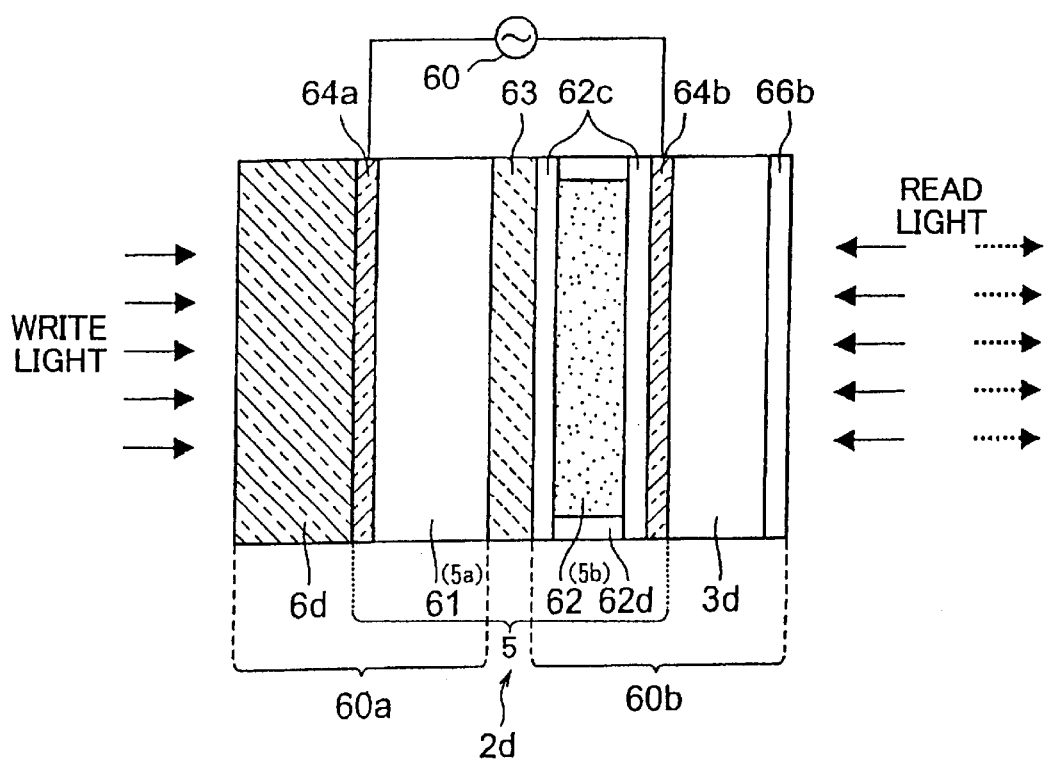
FIG. 15(b) schematically shows the configuration of a parallel aligned nematic-liquid-crystal spatial light modulator (PAL-SLM) 2d in the spatial light modulating device according to the fourth embodiment of the present invention.

FIG. 15(a) schematically shows the configuration of the spatial light modulating device 71 according to the fourth embodiment of the present invention.

According to the fourth embodiment, a parallel-aligned nematic-liquid-crystal spatial light modulator (PAL-SLM) 2d is employed as the optically-addressed type spatial light modulator. A transmission type liquid crystal element (liquid crystal television (LCTV)) 1d is employed as the electrically-addressed type element. The transmission type liquid crystal element (LCTV) 1d has 640×480 pixels with the pixel pitch P of 40 µm. The transmission type liquid crystal element (LCTV) 1d employs twisted-nematic (TN) liquid crystal as modulation material. The transmission type liquid crystal element (LCTV) id has the same structure as the transmission type liquid crystal element (LCTV) 1c shown in FIG. 8(a).

The thickness of the glass substrates 3a and 3b of the transmission type liquid crystal element (LCTV) 1d is equal to 0.5 mm. Light from a single mode semiconductor laser is collimated by a lens and is irradiated on the transmission type liquid crystal element (LCTV) 1d. The semiconductor laser has an oscillating wavelength of 660 nm.

The parallel-aligned nematic-liquid-crystal spatial light modulator (PAL-SLM) 2d employs a fiber optic plate (FOP) 6d as a substrate that confronts the transmission type liquid crystal element (LCTV) 1d. In other words, as shown in FIG. 15 (b), the parallel-aligned nematic-liquid-crystal spatial light modulator (PAL-SLM) 2d has the structure the same as that of the parallel-aligned nematic-liquid-crystal spatial light modulator (PAL-SLM) 2c shown in FIG. 8(b) except that the fiber optic plate (FOP) 6d is employed instead of the glass substrate 3c and that the anti-reflection coating 66a is not provided. The fiber optic plate (FOP) 6d has a pitch of 3 µm, and thickness of 3 mm.

A compensation layer 8c, including an index matching oil (to be described later) B, is provided between the image display portion 4 of the transmission type liquid crystal element (LCTV) 1d and the thin film material portion 5 of the parallel-aligned nematic-liquid-crystal spatial light modulator (PAL-SLM) 2d. Similarly to the third embodiment, because the transmission type liquid crystal element (LCTV) 1d uses the twisted nematic (TN) liquid crystal, it is necessary to provide polarizers on both sides of the TN liquid crystal layer in order to display images. Accordingly, similarly to the third embodiment, the polarizer 9a is provided on the input side of the glass substrate 3a, and the polarizer 9b is provided on the output side of the glass substrate 3b.

In this way, by using the transmission type liquid crystal element as the electrically-addressed type element, it is possible to produce write light that bears thereon signal images with little distortion. By using the optically-addressed type spatial light modulator that employs a photoconductive layer as the optical addressing layer 5a and that employs a liquid crystal layer as the light modulation layer 5b, it is possible to attain high diffraction efficiency.

Similarly to the third embodiment, by using the spatial light modulating device 71 with the above-described structure in the system of FIG. 9, it is possible to use the spatial light modulating device 71 both in the phase modulation mode and in the intensity modulation mode similarly as in the third embodiment.

In the present embodiment, an irradiation light source, similar to that employed in the third embodiment, is used. Accordingly, the relationship between the compensation layer thickness and the critical resolution capable of being transmitted is represented by the graph of FIG. 7. In the present embodiment, the spatial frequency 1/P for the pixel pitch P is equal to 25 (lp/mm). By setting the compensation layer thickness to about 1 mm, it is possible to set the critical resolution to about 23 (lp/mm). It is therefore possible to erase the pixel structure. Vertical and horizontal stripes with one pixel's worth of width displayed by the pixel structure 415 have the spatial frequency of ½ P=12.5 (lp/mm), which is smaller than the critical resolution. Accordingly, the relationship of "½ P<critical resolution<1/P" is satisfied. It is therefore possible to erase the image of the pixel structure 415, which has the spatial resolution of 1/P. It is possible to accurately transmit horizontal and vertical stripes with one pixel's worth of width, which have the spatial frequency of ½ P. Accordingly, it is possible to transmit the image displayed by the pixel structure 415 without degradation while erasing the image of the pixel structure 415, per se.

According to the present embodiment, the fiber optic plate (FOP) 6d is used as the substrate of the PAL-SLM that faces the transmission type liquid crystal element (LCTV) 1d. It is therefore possible to decrease the thickness of the compensation layer in comparison with the case where the glass substrate is used. It is therefore possible to allow the total thickness of the compensation layer to be about 1 mm. More specifically, according to the present embodiment, the compensation layer 8c of the spatial light modulating device 71, shown in FIG. 15(a), is constructed from: the glass substrate 3b of the transmission type liquid crystal element (LCTV) 1d, the polarizer 9b, and the index matching oil B. The thickness of the glass substrate 3b is 0.5 mm. The thickness of the polarizer 9b is 0.3 mm. Accordingly, by setting the thickness of the index matching oil B to 0.2 mm, it is possible to set the thickness of the compensation layer 8c to about 1 mm.

The index matching oil is liquid of a type that has viscosity and that has index of refraction substantially equal to that (1.5) of normal glass. Generally, index matching oil is provided when two glass materials are bonded together. The index matching oil is provided between the two glass materials in order to prevent light from reflecting off the bonded surfaces of the glass materials. More specifically, when two glass materials are bonded together, an air layer is formed inevitably between the two glasses. Because air has refractive index of 1.0, when the air layer is provided between the two glasses, reflection of about 4% occurs at each interface due to the difference between the refractive indices of air and glasses. The reflected light will become stray light. By inserting the index matching oil between the two glasses and then bonding the glasses together so that no air will be provided therebetween, it is possible to greatly suppress the reflection due to the refractive index difference.

In this way, by providing the index matching oil B, it is possible to easily attain the anti-reflection effect. It is possible to reduce the reflectivity greatly in comparison with the case where an anti-reflection film is used.

An experiment was conducted, similarly to the third embodiment, by using the spatial light modulating device of the present embodiment in the system of FIG. 9. The spatial light modulating device had the above-described structure. It was confirmed that diffraction lights generated due to the pixel structure was erased similarly to the third embodiment.

Thus, by using the fiber optic plate (FOP) 6d as the substrate of the PAL-SLM 2d that faces the transmission type liquid crystal element (LCTV) 1d, it is possible to set the thickness of the compensation layer 8c to about 1 mm and to realize the compact and high performance electrically-addressed spatial light modulating device.

The fiber optic plate (FOP) has a distribution of refractive index, with which the FOP can transmit the input image while maintaining the resolution of the input image. Accordingly, it is possible to decrease the thickness of the compensation layer. More specifically, in order to control the phase of light, the optically-addressed type spatial light modulator is generally required to have surfaces with high precision. Accordingly, it is necessary to provide the thin film material portion between substrates with very large thickness (5 mm or 10 mm). In such a case, the thickness of the compensation layer will become large. When light is transmitted from the image display portion to the thin film material portion, the image borne on the light will be degraded too much, thereby degrading the performance of the spatial light modulating device. Contrarily, by employing the configuration of the present embodiment, it is possible to reduce the thickness of the compensation layer and to solve the above-described problem.

In this way, according to the present embodiment, the substrate 3b of the LCTV 1d is constructed from the glass substrate, and the substrate 6d of the optically-addressed type spatial light modulator (PAL-SLM) 2d is constructed from the fiber optic plate (FOP). Accordingly, write light is transmitted through the compensation layer 8c, which includes the glass substrate 3b, before reaching the FOP 6d. Accordingly, the write light from each pixel 403 of the image display portion 4 spreads in a proper amount corresponding to the thickness of the compensation layer 8c, while the write light passes through the compensation layer 8c. Thereafter, the write light passes through the fiber optic plate (FOP) 6d, and then finally reaches the photoconductive layer 61 in the thin film material portion 5. Accordingly, it is possible to degrade the image in a proper degree and to transmit the properly-degraded image to the photoconductive layer 61.

Additionally, because the LCTV 1d is an intensity modulation device, the LCTV 1d is not required to have surfaces with high precision. The thickness of the glass substrate 3b, constituting the compensation layer 8, can therefore be made small. It is therefore possible to further reduce the total width of the compensation layer 8c into a desired amount, and to degrade the image in a corresponding desired degree.

It is conceivable to construct the substrate 3b of the LCTV 1d from a fiber optic plate (FOP) and to construct the substrate 6d of the PAL-SLM 2d from a glass substrate. This construction is, however, undesirable. According to this construction, write light will be transmitted through the fiber optic plate (FOP), before reaching the glass substrate. It is noted, however, that when light passes through the fiber optic plate (FOP) and outputs from the FOP, the light becomes a scattering light. Accordingly, the image borne on the light will be degraded too much. Additionally, the PAL-SLM 2d is a phase modulation device and therefore is required to have surfaces with high precision. The glass substrate has to have a relatively large thickness. Accordingly, the scattering light from the fiber optic plate (FOP) will pass through the thick glass plate, resulting that the image on the light will be degraded too much.

The spatial light modulating device of the present invention can be modified in a variety of ways, and is not limited to the above-described embodiments.

Figure 8A:
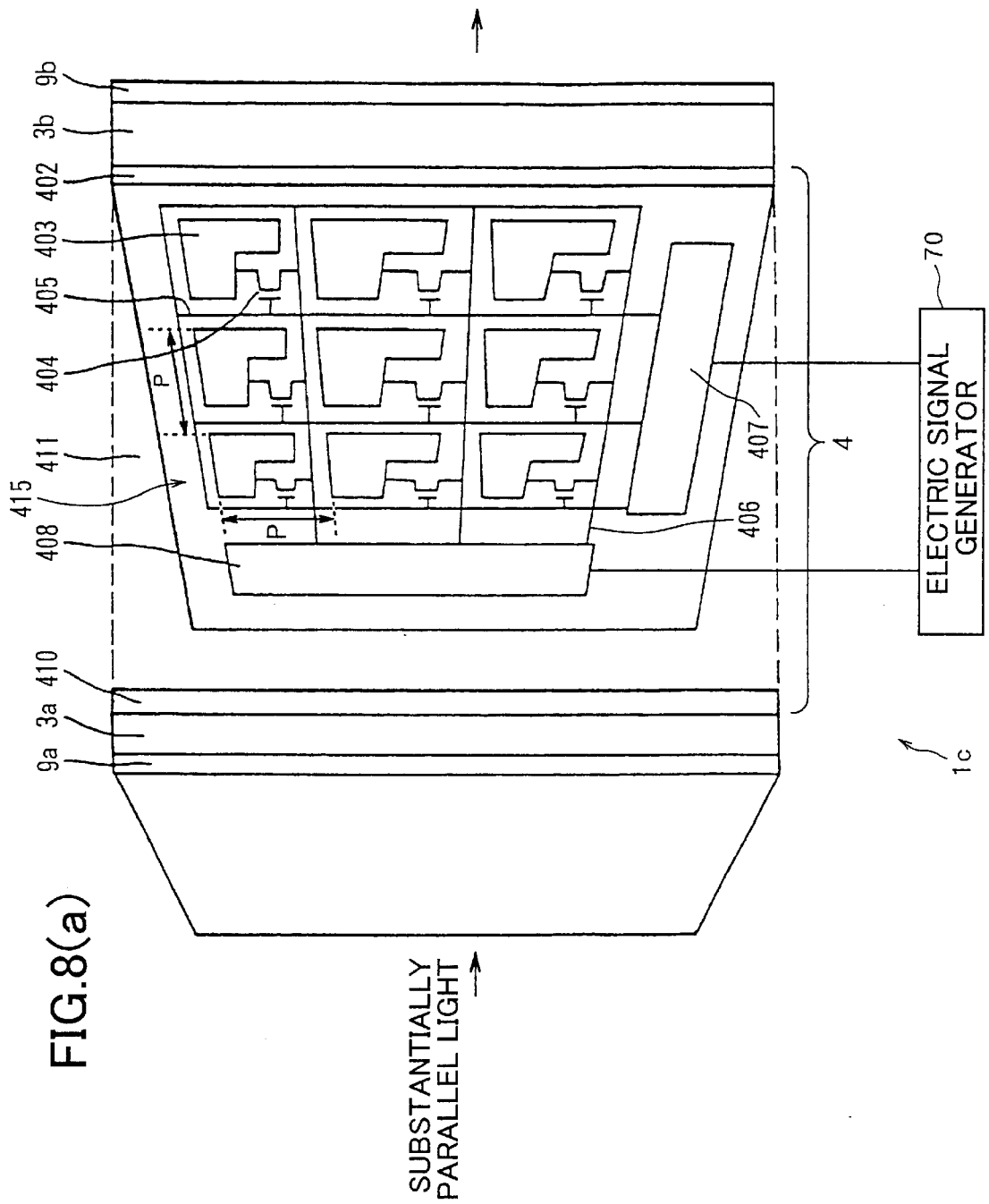
FIG. 8(a) schematically shows the configuration of a transmission type liquid crystal element 1c in the third embodiment.

For example, the LCTV 1c shown in FIG. 8(a) can be used as the electrically-addressed element 1a in the first and second embodiments. The parallel aligned nematic-liquid-crystal-spatial light modulator (PAL-SLM) 2c shown in FIG. 8(b) may be used as the optically-addressed type spatial light modulator 2a in the first embodiment. The parallel aligned nematic-liquid-crystal spatial light modulator (PAL-SLM) 2d shown in FIG. 15(b) may be used as the optically-addressed type spatial light modulator 2b in the second embodiment. In these cases, by using the spatial light modulating device 71 of the first and second embodiments in the system of FIG. 9, the spatial light modulating device 71 can be operated both in the phase modulation mode and in the intensity modulation mode similarly in the third embodiment.

In the fourth embodiment, the index matching oil B is provided. However, if reflection does not induce any important problems, the index matching oil B may not be provided. In this case, the polarizer 9b of the transmission type liquid crystal element (LCTV) 1d will be directly contacted with the fiber optic plate (FOP) 6d. The compensation layer 8c will be made from the glass substrate 3b and the polarizer 9b.

In the first through third embodiments, when it is desirable to suppress reflection, the index matching oil B may be provided instead of the air layer A similarly to the fourth embodiment.

Industrial Application

The spatial light modulating device according to the present invention can be broadly used for image projector display devices, and for optical information processors, which use diffraction phenomenon, such as a spatial Fourier transformation. Examples of the optical information processors include diffraction efficiency measurement devices, image recognition devices that perform fingerprint identification by using optical correlation calculation, and displacement/speed measuring devices.

What is claimed is:

1. A spatial light modulating device, comprising:
an electrically-addressed type element for being addressed by electric signals representing information to be written, the electrically-addressed type element including an image display portion having a pixel structure, the electrically-addressed type element being inputted with write light;
an optically-addressed type spatial light modulator including a thin film material portion and a pair of substrates, the thin film material portion being provided between the pair of substrates, the thin film material portion having an optical addressing layer and a light modulation layer, the optically-addressed type spatial light modulator being inputted with read light, one of the pair of substrates that faces the electrically-addressed type element being constructed from a fiber optic plate; and
a compensation layer having a predetermined thickness and provided between the image display portion and the fiber optic plate.

2. A spatial light modulating device as claimed in claim 1, further comprising:

a write light source for producing the write light; and a read light source for producing the read light.

3. A spatial light modulating device as claimed in claim 1, wherein the compensation layer has the thickness of an amount that causes the resolution of an output image to become smaller than a minimum resolution that is required to allow the pixel structure to appear in the output image.

4. A spatial light modulating device as claimed in claim 1, wherein the electrically-addressed type element includes a transmission type liquid crystal element.

5. A spatial light modulating device as claimed in claim 1, wherein the optically-addressed type spatial light modulator includes an optically-addressed type spatial light modulator that employs a photoconductive layer as the optical addressing layer and that employs a liquid crystal layer as the light modulation layer.

6. A spatial light modulating device as claimed in claim 1, wherein the write light source includes a semiconductor laser.

7. A spatial light modulating device as claimed in claim 1, further comprising a holding portion holding both of the electrically-addressed type element and the optically-addressed spatial light modulator, the compensation layer including an air layer having the predetermined thickness.

* * * * *